United States Patent
Kim et al.

(10) Patent No.: US 8,428,603 B2
(45) Date of Patent: Apr. 23, 2013

(54) PAGING METHOD IN AREA WHERE MACRO ASN AND FEMTO ASN ARE LINKED IN MOBILE NETWORK, AND SYSTEM THEREFOR

(75) Inventors: Kyung-Jin Kim, Seongnam-si (KR); Gyou-Hwan Kim, Suwon-si (KR); Gwang-Eun Kim, Seoul (KR); Jun-Hwan Oh, Seongnam-si (KR)

(73) Assignee: Samsung Electronics. Co., Ltd., Suwon-si (KR)

( * ) Notice: Subject to any disclaimer, the term of this patent is extended or adjusted under 35 U.S.C. 154(b) by 144 days.

(21) Appl. No.: 12/960,720

(22) Filed: Dec. 6, 2010

(65) Prior Publication Data

US 2011/0136491 A1 Jun. 9, 2011

(30) Foreign Application Priority Data

Dec. 7, 2009 (KR) ........................ 10-2009-0120569

(51) Int. Cl.
*H04W 36/08* (2009.01)
(52) U.S. Cl.
USPC .......................................... 455/444; 455/458

(58) Field of Classification Search ................... 455/444, 455/450, 458, 456.1; 370/312, 328
See application file for complete search history.

(56) References Cited

U.S. PATENT DOCUMENTS

2010/0159960 A1* 6/2010 Chou et al. .................... 455/458

* cited by examiner

*Primary Examiner* — Phuoc Doan
(74) *Attorney, Agent, or Firm* — Jefferson IP Law LLP

(57) ABSTRACT

A system and method for performing paging in an area where a macro Base Station (BS) and a femto Access Services Network (ASN) are linked in a mobile network are provided. The method includes, during handover of a Mobile Station (MS) between a macro ASN and a femto ASN, a first gateway of a current ASN acquires paging group information of a previous ASN. Upon request for paging from the MS in the current ASN, the first gateway requests a BS of the previous ASN to transmit paging information to the MS based on the paging group information of the previous ASN. By doing so, paging success rate may be improved for an MS in coverage of a macro ASN linked to a femto BS, and the high paging success rate may be guaranteed regardless of whether the handover scheme is a controlled handover scheme or an uncontrolled handover scheme.

18 Claims, 4 Drawing Sheets

PAGING METHOD IN AREA WHERE MACRO ASN AND FEMTO ASN ARE LINKED IN MOBILE NETWORK, AND SYSTEM THEREFOR

PRIORITY

This application claims the benefit under 35 U.S.C. §119(a) of a Korean patent application filed in the Korean Intellectual Property Office on Dec. 7, 2009 and assigned Serial No. 10-2009-0120569, the entire disclosure of which is hereby incorporated by reference.

BACKGROUND OF THE INVENTION

1. Field of the Invention

The present invention relates to interworking between a macro Access Services Network (ASN) and a femto ASN in a mobile network. More particularly, the present invention relates to a method and a system for successfully paging a Mobile Station (MS), when the MS located in an area where a macro ASN and a femto ASN are linked is in an idle mode.

2. Description of the Related Art

For a Mobile Station (MS) registered in a Mobile Worldwide Interoperability for Microwave Access (M-WiMAX) network and receiving a service in an active state, if there is no more data to transmit and/or receive, the MS transitions to an idle mode to save its power, thus preventing power consumption. After the MS transitions to the idle mode, if there is traffic to be transmitted to the MS, an Access Services Network Gateway (ASN-GW) awakes the MS by sending a paging message to a Base Station (BS) corresponding to a paging group of the MS and then performs a network re-entry process.

Even an M-WiMAX femto BS may awaken an MS in an idle state by sending a paging message through the above procedure.

FIG. 1 illustrates a Network Reference Model (NRM) according to the related art.

Referring to FIG. 1, an NRM includes a macro ASN including a macro BS and a macro ASN-GW; a femto ASN including a WiMAX femto cell Access Point (WFAP), a Security Gateway (SeGW), a femto-GW, and a Self Organization Network (SON); a Connectivity Service Network (CSN) (or Network Service Providers (NSP)) including an Authentication, Authorization, and Accounting (AAA) and a Home Agent (HA); and a femto NSP including a WFAP AAA, a WFAP Management (WFAP Mgmt), a bootstrap server, interwork with one another through interfaces such as R1, R4 and R6.

FIG. 2 illustrates a configuration of a macro ASN and a femto ASN according to the related art.

Referring to FIG. 2, a macro ASN 220 and a femto ASN 210 are configured independently. As to a femto ASN forming a femto cell, the femto ASN may be configured in a macro ASN, or the femto ASN may be configured near a macro ASN. Because the femto ASN is a micro network formed for the use of home, personal, office, etc., numerous femto BSs may exist (e.g., hundreds of thousands of femto BSs), and a user may freely control an on/off state of the femto BSs at his or her discretion.

Therefore, since it is not possible to estimate which femto BSs exist near a macro BS, it is almost impossible to pre-configure neighboring information and paging information of femto BSs in a macro ASN.

For example, since the femto ASN is a micro home BS, an MS 200 registered in a femto BS #2 208 in FIG. 2 is not registered in other femto BSs (i.e., a femto BS #1 or a femto BS #3 in FIG. 2). That is, as to a paging area of an MS registered in one femto BS, only a femto BS in which the MS is registered and a macro BS is linked thereto are valid as the paging area. Further description in relation to FIG. 2 will be provided below.

Even though a femto BS is for home use and signals transmitted and received to/from the femto BS are only valid in a building, considering that an MS may be located in the boundary of the building or in macro coverage outside the building, it is apparent that sending a paging message not only in a femto area but also in a macro area is superior in performance improvement to sending a paging message only to the registered femto BS.

Assume that an MS transitions to an idle mode after performing a handover from a macro ASN to a femto ASN. If there is traffic in the network to be delivered to the MS, a BS of a femto ASN to which the MS belongs to orders the MS to transition to an active state through a network re-entry process by sending a paging message.

Even though an MS has performed an idle handover from a femto ASN to a macro ASN, if the MS has not yet performed Location Update (LU) for the reason that it has not yet detected the change in its Paging Group (PG), a paging message cannot be sent from the macro ASN to the MS, but is sent from the femto ASN to the MS, failing to awaken the MS.

On the contrary, even when an MS has moved to a femto ASN in an idle state after performing a handover from the femto ASN to a macro ASN, the MS may fail to be awakened.

Therefore, a need exists for a method and a system for improving a paging success rate of an MS that has transitioned to an idle state after performing a Hand-in handover from a macro ASN to a femto ASN or performing a Hand-out handover from a femto ASN to a macro ASN.

SUMMARY OF THE INVENTION

An aspect of the present invention is to address at least the above-mentioned problems and/or disadvantages and to provide at least the advantages described below. Accordingly, an aspect of the present invention is to provide a method and a system for improving a paging success rate of a Mobile Station (MS) that has transitioned to an idle state after performing a Hand-in handover from a macro Access Services Network (ASN) to a femto ASN or performing a Hand-out handover from a femto ASN to a macro ASN.

Another aspect of exemplary embodiments of the present invention is to provide a method and a system for successfully paging an MS when the MS located in an area where a macro ASN and a femto ASN are linked is in an idle mode.

In accordance with one aspect of the present invention, a method for paging a MS in an area where a macro Base Station (BS) and a femto ASN are linked in a mobile network is provided. The method includes, during handover of the MS between a macro ASN and a femto ASN, acquiring paging group information of a previous ASN by a first gateway of a current ASN, and upon request for paging from the MS in the current ASN, requesting, by the first gateway, a BS of the previous ASN to transmit paging information to the MS based on the paging group information of the previous ASN.

In accordance with another aspect of the present invention, a system for paging a MS in an area where a macro BS and a femto ASN are linked in a mobile network is provided. The system includes a first gateway of a current ASN for acquiring paging group information of a previous ASN, during handover of the MS between a macro ASN and a femto ASN, and a BS of the current ASN for, upon request for paging from the MS in the current network, requesting a BS of the previous ASN to transmit paging information to the MS by means of the first gateway based on the paging group information of the previous ASN.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
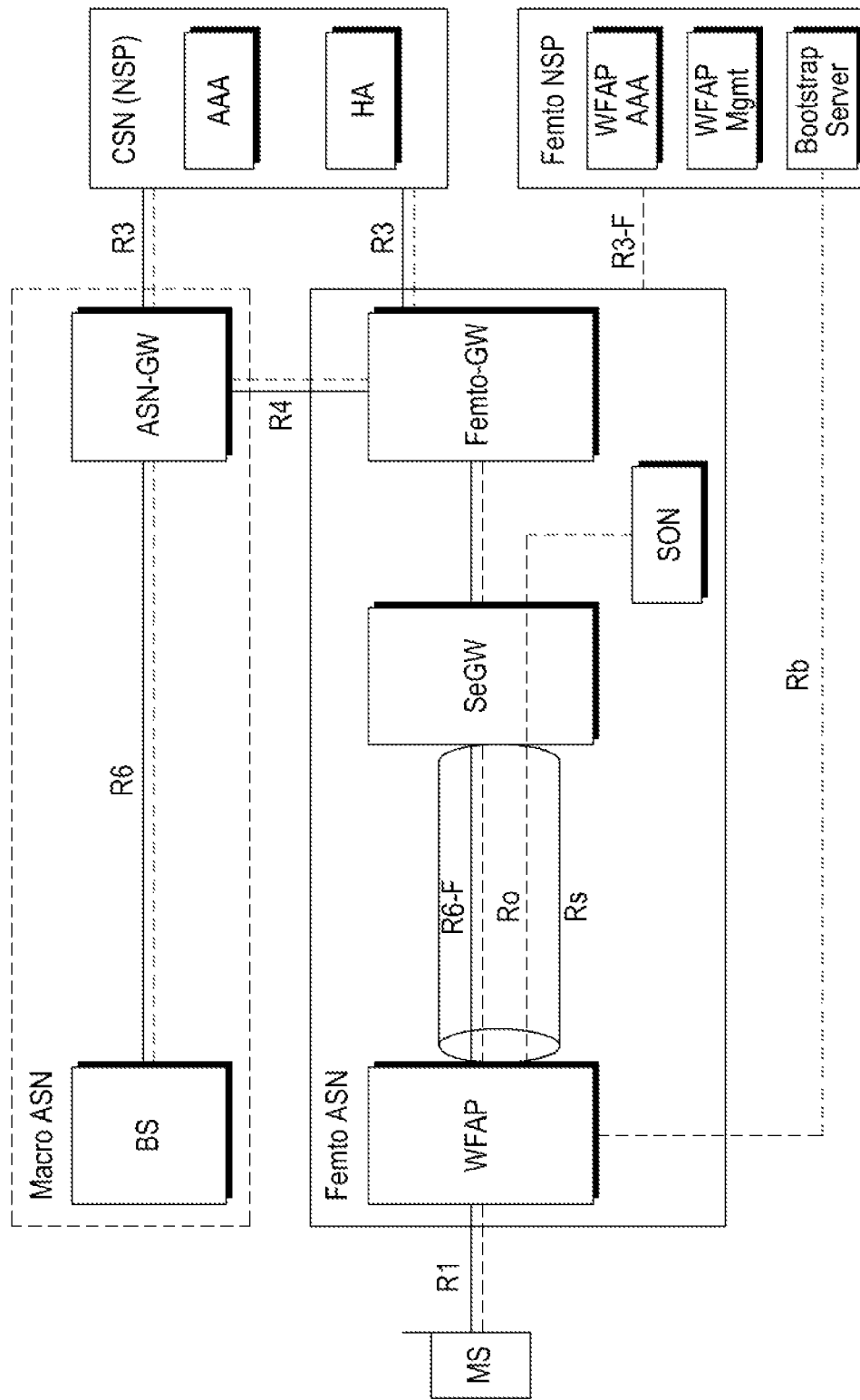
FIG. 1 is a diagram illustrating a network reference model according to the related art.
Figure 2:
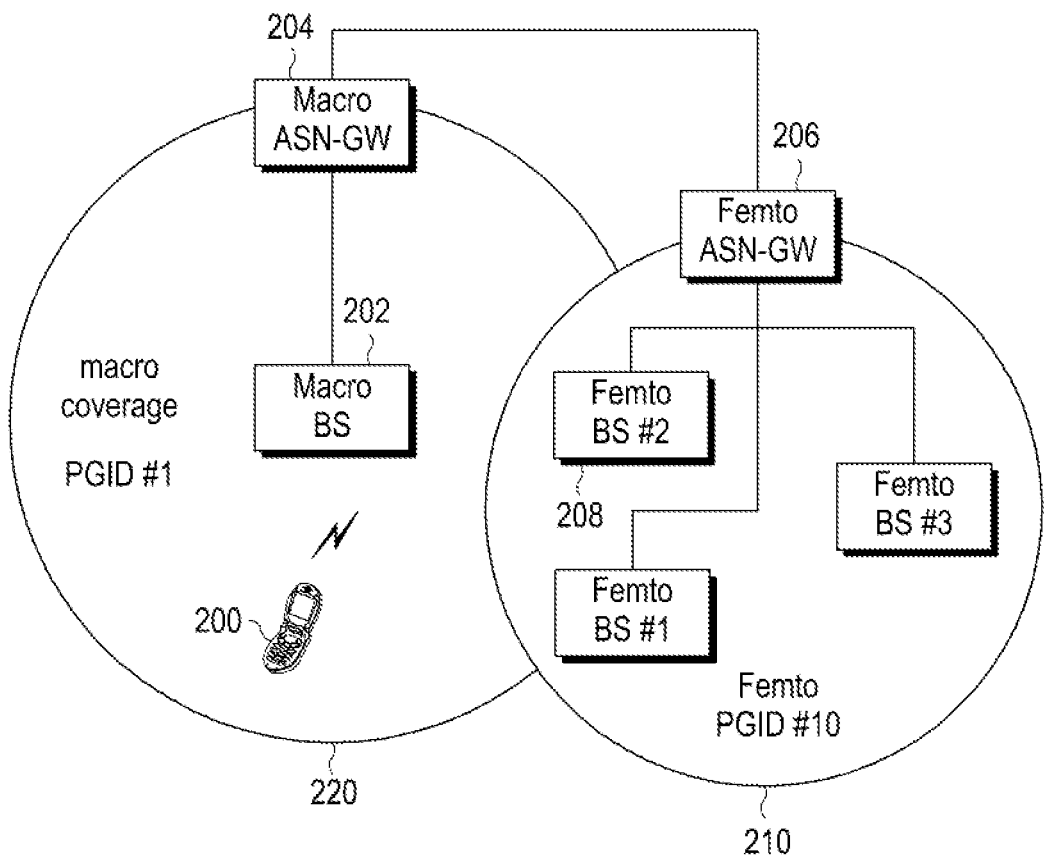
FIG. 2 is a diagram illustrating a configuration of a macro Access Services Network (ASN) and a femto ASN according to the related art.
Figure 3:
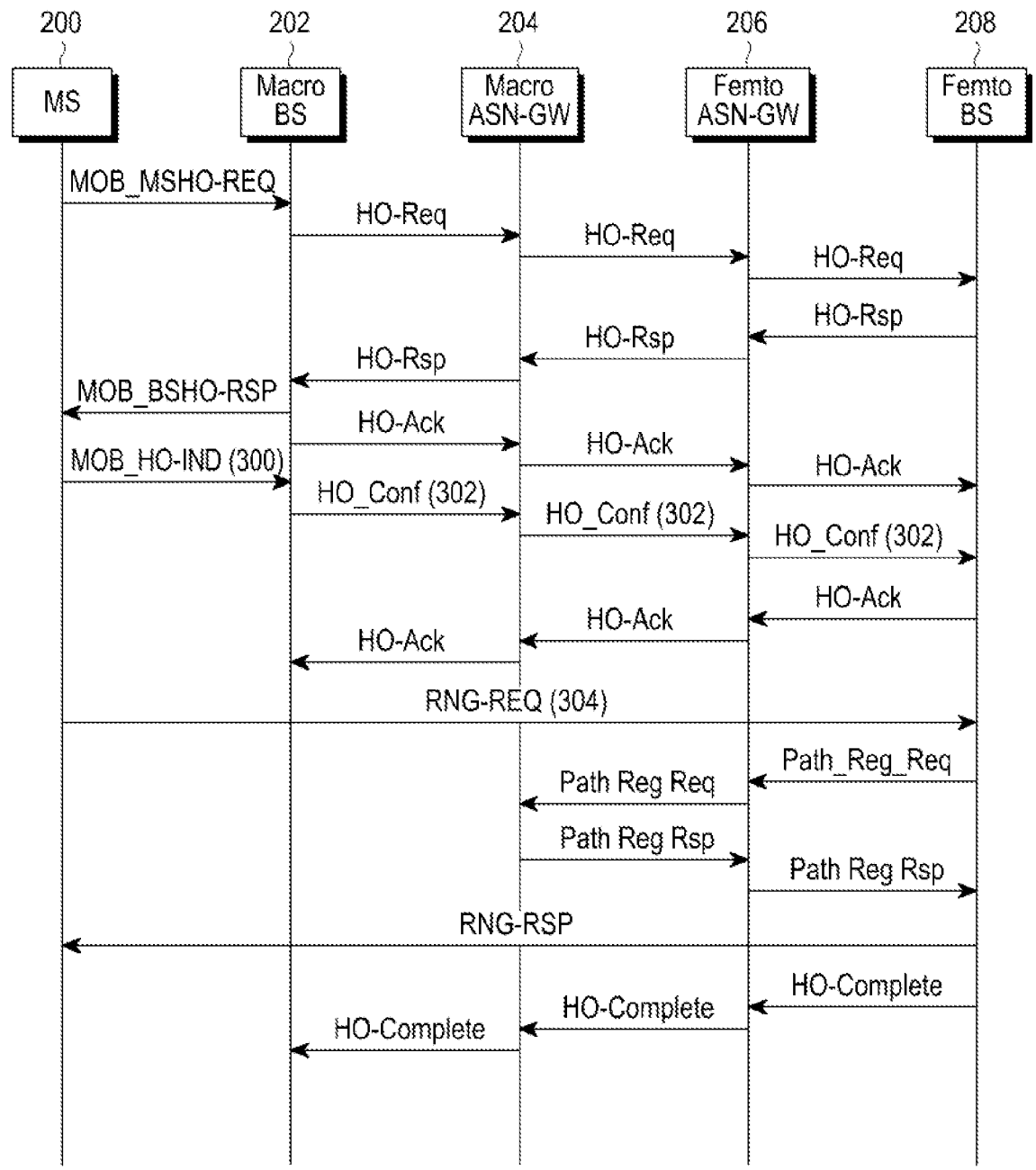
FIG. 3 is a diagram illustrating a call flow of delivering paging group information of a serving Base Station (BS) in a controlled handover according to an exemplary embodiment of the present invention.
Figure 4:
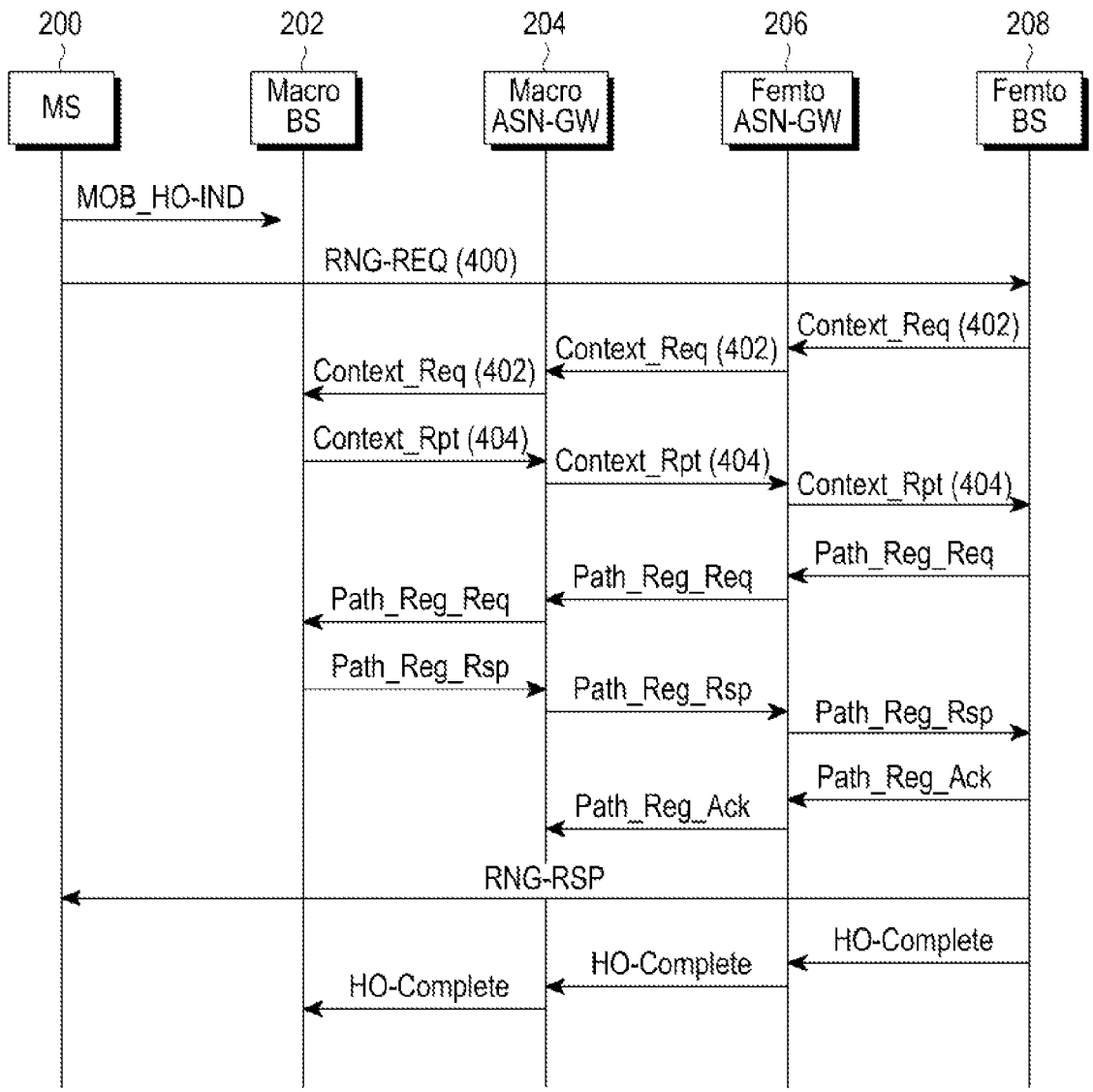
FIG. 4 is a diagram illustrating a call flow of delivering paging group information in an uncontrolled handover according to an exemplary embodiment of the present invention.

FIGS. 2 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Reference will be made to the network configuration of FIG. 2.

If a Mobile Station (MS) 200, which has set up a call through a macro BS 202, moves to a femto Base Station (BS) #2 208 through handover, a femto Access Services Network Gateway (ASN-GW) 206 has BS IDentification (ID) information of the macro BS 202 but does not have Paging Group ID (PGID) information thereof. Therefore, for an MS that has transitioned to an idle state after performing a handover, it is impossible for a femto ASN-GW to send a paging message even to a macro BS. This is the same even when an MS performs a handover to the macro BS 202 after setting up a call through the femto BS #2 208.

When an MS transitions to an idle state after a handover from a macro ASN to a femto ASN, or from a femto ASN to a macro ASN, an exemplary embodiment of the present invention allows an ASN-GW sending a paging message to acquire paging group information of a previous ASN, thereby making it possible to deliver the paging message not only to a serving BS of the current ASN but also to a serving BS of the previous ASN.

The following three exemplary embodiments of the present invention are provided to enable a BS of a new network to acquire the paging group information of the previous ASN during inter-network handover of an MS. The paging group information may be a PGID.

A first exemplary embodiment of the present invention provides a method in which during handover, a target BS receives context information of an MS in a serving network through an ASN-GW of a target network. A second exemplary embodiment of the present invention provides a method in which an MS transmits PGID information of a serving BS together when sending a Ranging Request (RNG-REQ) message to a target BS. A third exemplary embodiment of the present invention provides a method in which if a target BS is a femto BS, the femto BS directly decodes a signal from a neighboring macro BS(s) using a Self Organization Network (SON) function, and delivers the decoded signal to a femto ASN-GW. A detailed description of each exemplary embodiment will be made below.

The first exemplary embodiment provides a method in which an MS delivers its paging group information to a target BS when sending a handover request to a serving BS. The first exemplary embodiment may be subdivided into two types according to the handover schemes, and a message carrying the paging group information is different according to whether the handover scheme is a controlled handover or an uncontrolled handover.

Call flows based on the different handover schemes are shown in FIGS. 3 and 4, in which an MS performs a handover from a macro ASN to a femto ASN.

FIG. 3 is a diagram illustrating a call flow of delivering paging group information of a serving BS in a controlled handover according to an exemplary embodiment of the present invention.

The call flow in the controlled handover scheme of FIG. 3 will now be described.

Referring to FIG. 3, a femto ASN-GW 206 belonging to a target network receives a PGID of a macro BS 202 through a macro ASN-GW 204.

More particularly, when performing handover from the macro BS 202 to the femto BS 208, an MS 200 delivers information about the macro BS 202 to the femto ASN-GW 206, and this information is delivered from the macro BS 202 to the femto BS 208 through the macro ASN-GW 204 and the femto ASN-GW 206, using a HandOver Configuration (HO_Conf) message 302.

More particularly, the MS 200 sends a Mobile MS HandOver Request (MOB_MSHO-REQ) message to the macro BS 202, and the macro BS 202 sends a HandOver Request (HO-Req) message to the femto BS 208 through the macro ASN-GW 204 and the femto ASN-GW 206. The femto BS 208 sends a HandOver Response (HO-Rsp) message to the macro BS 202 through the femto ASN-GW 206 and the macro ASN-GW 204. The macro BS 202 sends a Mobile BS HandOver Response (MOB_BSHO-RSP) message to the MS 200. In addition, the macro BS 202 sends a HandOver Acknowledgement (HO-Ack) message to the femto BS 208 through the macro ASN-GW 204 and the femto ASN-GW 206. Thereafter, the MS 200 sends an MS HandOver Indication (MOB_HO-IND) message 300 to the macro BS 202, and the macro BS 202 sends a HO_Conf message 302 to the femto BS 208 through the macro ASN-GW 204 and the femto ASN-GW 206. The HO_Conf message 302 carries paging group information. In response, the femto BS 208 sends a HO-Ack message to the macro BS 202 through the femto ASN-GW 206 and the macro ASN-GW 204. If the MS 200 sends a RNG-REQ message 304 to the femto BS 208, the femto BS 208 sends a Path Registration Request (Path_Reg_Req) message to the macro ASN-GW 204 through the femto ASN-GW 206, and the macro ASN-GW 204 sends a Path Registration Response (Path_Reg_Rsp) message to the femto BS 208 through the femto ASN-GW 206. In addition, the femto BS 208 sends a Ranging Response (RNG-RSP) message to the MS 200, and sends a HandOver Complete (HO-Complete) message to the macro BS 202 through the femto ASN-GW 206 and the macro ASN-GW 204.

TABLE 1

| | Paging Group ID |
|---|---|
| Type | 123 |
| Length in octets | 2 |
| Value | Byte String |
| Description | 16-bit ID representing Paging Group |
| Parent TLV(s) | Paging Information, BS Info |

Table 1 shows a definition of Type-Length-Value (TLV) of a PGID according to an exemplary embodiment of the present invention.

TABLE 2

| IE | M/O | Notes |
|---|---|---|
| ... | | |
| BS Info (Serving) | M | |
| > Serving/Target Indicator | M | Set to Serving |

TABLE 2-continued

| IE | M/O | Notes |
|---|---|---|
| > BS ID | M | |
| > Paging Group ID | M | See Table 1, Newly added |
| BS Info (Target) | M | |
| > Serving/Target Indicator | M | Set to Target |
| > BS ID | M | |
| > Paging Group ID | O | See Table 1, Newly added |
| ... | | |

Table 2 shows a format of a HO_Conf message according to an exemplary embodiment of the present invention.

Tables 1 and 2 show partial modifications of TLV defined in the Network Working Group (NWG) standard of WiMAX Forum. In Table 1, parent TLV is extended from the existing Paging Information TLV to BS Info TLV. In Table 2, Paging Group ID TLV in Serving BS Info is additionally defined.

FIG. 4 is a diagram illustrating a call flow of delivering paging group information in an uncontrolled handover according to an exemplary embodiment of the present invention.

When performing a handover from a macro BS 202 to a femto BS 208 in accordance with an uncontrolled handover scheme, an MS 200 delivers PGID information using a Context Report (Context_Rpt) message 404.

Referring to FIG. 4, the unconnected arrow of a MOB_HO-IND message heading from the MS 200 to the macro BS 202 denotes that handover occurs without the MOB_HO-IND message. In the example of FIG. 4, handover occurs without a MOB_HO-IND message from the MS 200, and the process performed before the MS 200 sends a RNG-REQ message 400 to the femto BS 208, is not considered for simplicity. The process performed before the MS 200 sends the RNG-REQ message 400 to the femto BS 208 in FIG. 4, is equal to the process performed before the MS 200 sends the MOB_HO-IND message to the macro BS 202 in FIG. 3.

More particularly, if the MS sends the RNG-REQ message 400 to the femto BS 208, the femto BS 208 sends a Context Request (Context_Req) message 402 to the macro BS 202 through the femto ASN-GW 206 and the macro ASN-GW 204, and the macro BS 202 sends a Context_Rpt message 404 to the femto BS 208 through the macro ASN-GW 204 and the femto ASN-GW 206. Thereafter, the femto BS 208 sends a Path_Reg_Req message to the macro BS 202 through the femto ASN-GW 206 and the macro ASN-GW 204, and the macro BS 202 sends a Path_Reg_Rsp message to the femto BS 208 through the macro ASN-GW 204 and the femto ASN-GW 206. In response, the femto BS 208 sends a Path Registration Acknowledgement (Path_Reg_Ack) message to the macro ASN-GW 204 through the femto ASN-GW 206. In addition, the femto BS 208 sends an RNG-RSP message to the MS 200, and sends a HO-Complete message to the macro BS 202 through the femto ASN-GW 206 and the macro ASN-GW 204.

TABLE 3

| IE | M/O | Notes |
|---|---|---|
| ... | | |
| BS Info (Serving) | M | |
| > BS ID | M | |
| > Paging Group ID | M | See Table 1, Newly Added |
| ... | | |

Table 3 shows a format of a Context_Rpt message according to an exemplary embodiment of the present invention.

Table 3 shows partial modifications of TLV defined in the NWG standard of WiMAX Forum. In this regard, parent TLV is extended from the existing Paging Information TLV to BS Info TLV in Table 1, and Paging Group ID TLV in Serving BS Info is defined in Table 3.

The second exemplary embodiment of the present invention provides a method in which an MS delivers paging group information when sending an RNG-REQ message to a target BS in a handover procedure.

In this exemplary embodiment, the MS delivers Paging Group ID to the femto BS 208 using the RNG-REQ message 304 or 400 in FIG. 3 or 4, regardless of whether it uses the controlled handover or the uncontrolled handover scheme.

TABLE 4

| Name | Type | Length (byte) | Value |
|---|---|---|---|
| ... | | | |
| Paging Group ID | 35 | 2 | Paging Group ID of Serving BS |
| ... | | | |

Table 4 shows new TLV according to an exemplary embodiment of the present invention, which is newly defined in the RNG-REQ message defined in the Institute of Electrical and Electronics Engineers (IEEE) 802.16e standard.

Since the RNG-REQ message additionally includes Paging Group ID TLV, a femto BS may acquire paging group information of a macro ASN by sending the RNG-REQ message, and delivers the acquired information to its ASN-GW.

While it is assumed in the first and second exemplary embodiments that an MS, which has been located in the macro BS, performs handover to a femto BS, the first and second exemplary embodiments may be applied even when an MS, which has been located in the femto BS, performs handover to a macro BS.

Even in this case, a target BS or a target ASN-GW may acquire PGID information of the serving BS by using a HO_Conf message or a Context_Rpt message or by using an RNG-REQ message being sent to the target BS during controlled handover or uncontrolled handover as described in the first or second exemplary embodiment.

The third exemplary embodiment of the present invention provides a method in which when a femto BS is first installed and performs an initialization operation, the femto BS acquires paging group information by decoding a signal from a neighboring macro BS(s) using a SON function and delivers the acquired information to a femto ASN-GW.

More particularly, when first installed, a femto BS performs a SON function. When performing an initial radio configuration operation, one of the SON function, the femto BS detects signals from its neighboring BSs and decodes the detected signals. The femto BS decodes even a Downlink Channel Description (DCD) message sent by a macro BS. The DCD message, which is radio channel information related to a downlink of the macro BS, includes a PGID. Therefore, the femto BS may extract a Paging Group ID TLV value included in the DCD message and store the extracted value.

When an MS attempts re-entry into the femto ASN-GW, the femto BS transmits PGID information of the macro BS, allowing the femto ASN-GW to use the PGID information when necessary, i.e., when later performing extended paging for the MS. A detailed description of the SON function is not provided for simplicity.

During initial configuration and reconfiguration between the femto BS and the femto ASN-GW, PGID information of neighboring macro BSs is delivered in the format of new TLV, similar to that in Table 4.

A description will now be made of a process in which a femto ASN-GW, which has acquired paging group information of a macro ASN, expands the area where it sends a paging message.

Having acquired paging group information of a macro ASN through any one of the three exemplary embodiments described above, the femto ASN-GW first sends a paging message to the femto BS when it should awaken an MS as needed after the MS has transitioned to the idle state. Thereafter, upon failure to receive a paging response from the femto BS, the femto ASN-GW requests that the macro BS of the macro ASN sends a paging message to the MS. To improve the paging effect, the femto ASN-GW may request that the macro BS sends a paging message to the MS at the same time it sends the paging message to the femto BS (no matter whether it receives a paging response). That is, the femto ASN-GW sends an MS paging announce message to the macro ASN-GW based on the paging group information acquired through the above embodiments, enabling the macro BS to forward the paging message to the MS.

The above-described operation may be implemented by installing a memory device storing a relevant program code in each of the ASN-GW, BS and MS. That is, a BS and an MS each perform the above operation by reading and executing the program code stored in the memory device by means of a processor or a Central Processing Unit (CPU).

As is apparent from the foregoing description, exemplary embodiments of the present invention may improve a paging success rate for an MS in coverage of a macro ASN linked to a femto BS.

In addition, the high paging success rate may be guaranteed regardless of whether the handover scheme is a controlled handover scheme or an uncontrolled handover scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for paging a Mobile Station (MS) in an area where a macro Base Station (BS) and a femto Access Services Network (ASN) are linked in a mobile network, the method comprising:
   during handover of the MS between a macro ASN and a femto ASN, acquiring paging group information of a previous ASN by a first gateway of a current ASN; and
   upon request for paging from the MS in the current ASN, requesting, by the first gateway, a BS of the previous ASN to transmit paging information to the MS based on the paging group information of the previous ASN.

2. The method of claim 1, wherein the acquisition of the paging group information comprises;
   during handover of the MS, transmitting, by the BS of the previous ASN, the paging group information to the first gateway through a BS of the current ASN.

3. The method of claim 2, wherein the paging group information is transmitted using a HandOver Configuration (HO_Conf) message being sent from a second gateway of the previous ASN to the first gateway.

4. The method of claim 2, wherein the paging group information is transmitted using a Context Report (Context_Rpt) message being sent from a second gateway of the previous ASN to the first gateway.

5. The method of claim 1, wherein the acquisition of the paging group information comprises;
during handover of the MS, transmitting by the MS the paging group information to the first gateway through a BS of the current ASN.

6. The method of claim 5, wherein the paging group information is transmitted using a Ranging Request (RNG-REQ) message being sent from the MS to the first gateway.

7. The method of claim 5, wherein the paging group information is received using a Ranging Response (RNG-RSP) message being sent from the first gateway to the MS.

8. The method of claim 1, wherein the acquisition of the paging group information comprises;
if the current ASN is a femto ASN, acquiring by a BS of the femto ASN the paging group information transmitted from BSs of the previous ASN by performing a Self Organization Network (SON) function and delivering the acquired paging group information to the first gateway.

9. The method of claim 8, wherein the paging group information of the previous ASN is acquired by decoding a Downlink Channel Description (DCD) message transmitted from the BSs of the previous ASN.

10. A system for paging a Mobile Station (MS) in an area where a macro Base Station (BS) and a femto Access Services Network (ASN) are linked in a mobile network, the system comprising:
a first gateway of a current ASN for acquiring paging group information of a previous ASN, during handover of the MS between a macro ASN and a femto ASN; and
a BS of the current ASN for, upon request for paging from the MS in the current network, requesting a BS of the previous ASN to transmit paging information to the MS by means of the first gateway based on the paging group information of the previous ASN.

11. The system of claim 10, wherein during handover of the MS, the first gateway acquires the paging group information transmitted by a BS of the previous ASN through a BS of the current ASN.

12. The system of claim 11, wherein the paging group information is transmitted using a HandOver Configuration (HO_Conf) message being sent from a second gateway of the previous ASN to the first gateway.

13. The system of claim 11, wherein the paging group information is transmitted using a Context Report (Context_Rpt) message being sent from a second gateway of the previous ASN to the first gateway.

14. The system of claim 10, wherein during handover of the MS, the first gateway acquires the paging group information transmitted by the MS through a BS of the current ASN.

15. The system of claim 14, wherein the paging group information is transmitted using a Ranging Request (RNG-REQ) message being sent from the MS to the first gateway.

16. The system of claim 10, wherein if the current ASN is a femto ASN, the first gateway acquires the paging group information transmitted from BSs of the previous ASN by performing a Self Organization Network (SON) function by means of a BS of the femto ASN.

17. The system of claim 16, wherein the paging group information of the previous ASN is acquired by decoding a Downlink Channel Description (DCD) message transmitted from the BSs of the previous ASN.

18. The system of claim 16, wherein the paging group information is received using a Ranging Response (RNG-RSP) message being sent from the first gateway to the MS.

* * * * *